Dec. 27, 1949     F. J. MARCO     2,492,166
METHOD OF CONDENSER MANUFACTURE
Filed July 12, 1944     2 Sheets—Sheet 1
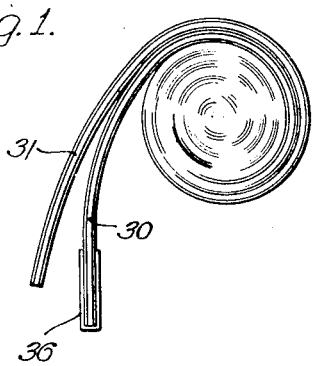
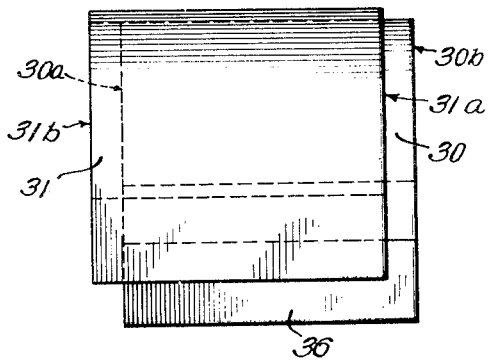
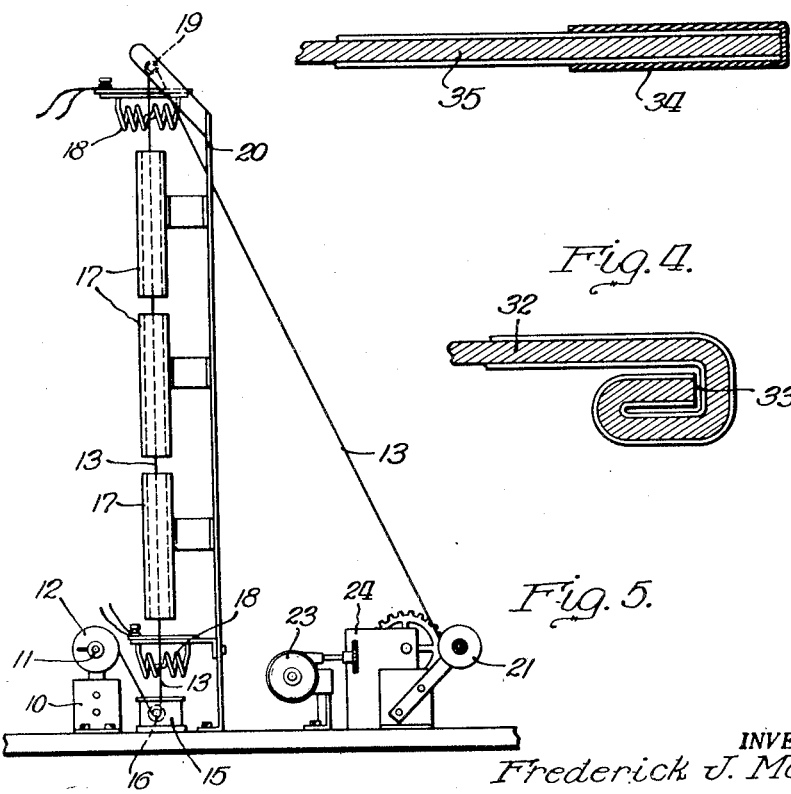
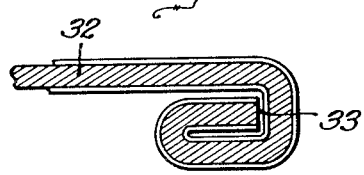
INVENTOR.
Frederick J. Marco
BY Eugene M. Giles
Atty.

Dec. 27, 1949 F. J. MARCO 2,492,166
METHOD OF CONDENSER MANUFACTURE
Filed July 12, 1944 2 Sheets-Sheet 2
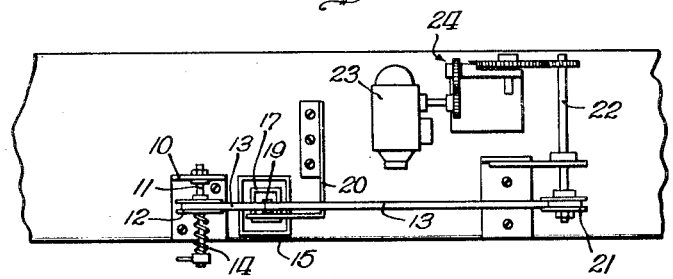
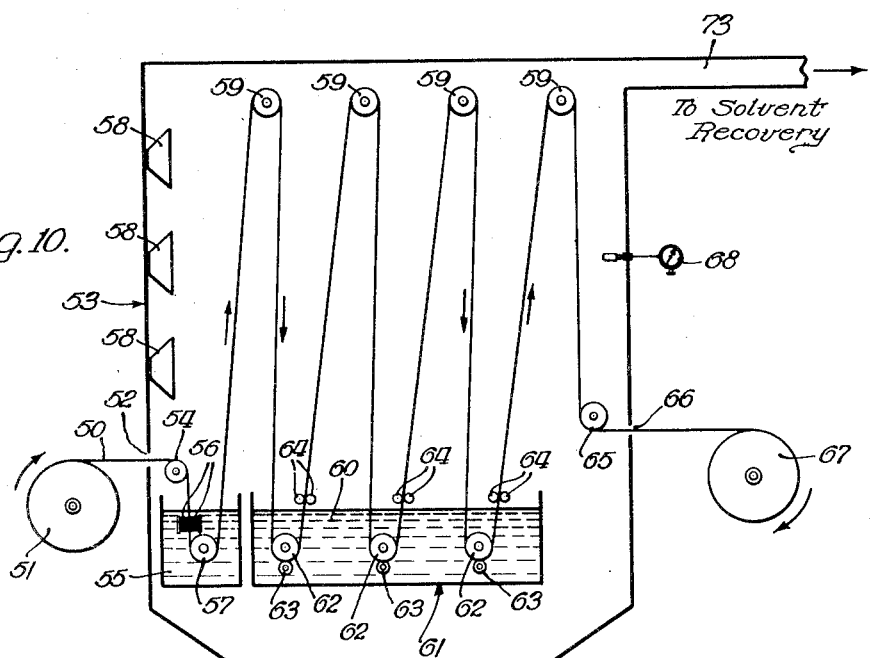
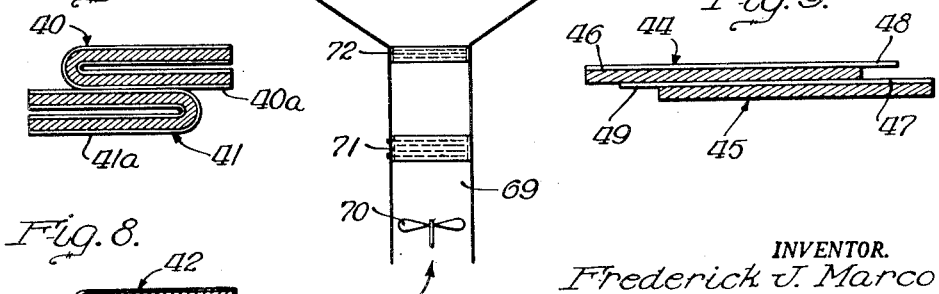
INVENTOR.
Frederick J. Marco
BY Eugene M. Giles
Atty.

Patented Dec. 27, 1949

2,492,166

UNITED STATES PATENT OFFICE 2,492,166

METHOD OF CONDENSER MANUFACTURE

Frederick J. Marco, Des Plaines, Ill.

Application July 12, 1944, Serial No. 544,491

18 Claims. (Cl. 154—80)

This invention relates to electric capacitors or condensers and, specifically, to methods for the manufacture of the same. More particularly, the invention relates to a novel and improved high-Q capacitor of the wound foil type and to processes and facilities which may be employed in the fabrication thereof. While the capacitor is described hereinafter in some detail, the present application is drawn primarily to methods and apparatus for the efficient and economical production thereof and the capacitor itself is more fully disclosed and claimed in my companion application executed of even date herewith, Serial No. 544,492.

In addition to the well known mica condensers, there have been rather widely employed, for certain limited uses, a type of capacitor which employs ribbons of metal foil separated or interleaved by separate ribbons or strips of a dielectric material such as impregnated paper, regenerated cellulose and the like, the whole wound in tubular fashion and generally pressed flat. Such wound capacitors, while acceptable for certain purposes, have various faults which render them ill adaptable for many uses, particularly in high frequency fields such as, for instance, in the range of radio frequencies. Moreover, their manufacture is tedious and expensive requiring, as it does, the production, handling and winding of at least four separate strips, two of foil and two of dielectric. Frequently it is even necessary to employ as many as six strips of dielectric, in addition to the foil ribbons, in order to minimize the danger of pinholes in the dielectric material which would cause lower breakdown voltage than expected.

Now the present invention aims at the production of a compact low loss high-Q capacitor utilizing ribbons of foil, but wherein the heretofore necessary separate and distinct dielectric elements are eliminated. To this end the invention utilizes the properties of various plastics or thermoplastic resins which may be applied in thin films over the surfaces of the foil and, when hardened or cured, form impervious homogeneous coatings with dielectric properties approaching, or in some cases even surpassing, those of mica. It is then a very simple matter to wind two such coated foil ribbons into a compact capacitor, necessitating the handling of but two strips, as against the previously required four, six, or even more, strips. Moreover the capacitor of the present invention will be found to have electrical properties far superior to those of the paper interleaved type and equaling or even surpassing those of mica capacitors.

It is a prime object of the present invention to provide for the manufacture of a new and improved electric capacitor of the foil wound type having electrical properties which are far superior to those encountered in previously known wound condensers.

Another object is to simplify the manufacture of such condensers by providing the foil electrodes with integrally carried dielectric films thus necessitating the handling in the winding operation of but two strips.

A further object is to employ the desirable electrical properties of various plastics or resins in the production of a capacitor of simple construction, compact nature and excellent electrical performance.

Another object is to provide simple and efficient methods for the manufacture of the capacitor, including procedures for applying films or coatings of plastic dielectric material to the faces of metal foil, the hardening or curing of these films into impervious, flexible coatings, and the subsequent winding of the thus coated strips into condenser form.

A still further object of the invention is to provide for the production and manufacture of separate thin films of plastic dielectric material, which material may be used in the practice of the present invention, as well as in other fields.

With these and other objects in view the invention comprises the novel combination and arrangement of parts and the methods of procedure hereinafter fully described, illustrated in the accompanying drawings, and particularly pointed out in the claims hereto appended, it being understood that the invention is not to be limited to the particular embodiments shown and described, but that many variations thereof are possible, within the scope of the appended claims, without departing from the spirit of the invention or sacrificing any of the advantages thereof.

In the drawings:

Fig. 1 is a sectional view, greatly enlarged, through a capacitor produced in the manner of the present invention, shown in the process of being wound.

Fig. 2 is an elevational view of the capacitor of Fig. 1 looking from the left of said figure.

Fig. 3 is a fragmentary sectional view of a strip of coated foil showing a manner of protecting the raw end preparatory to the winding operation.

Fig. 4 is a similar fragmentary sectional view showing an alternative manner of protecting or insulating the raw ends.

Fig. 5 is a side elevation of a simple apparatus for the coating of metal foil with plastic dielectric and drying or hardening of the film.

Fig. 6 is a top plan view of the apparatus of Fig. 5.

Fig. 7 illustrates an alternative manner of making a condenser of the coated foil of the present invention, utilizing two strips of foil coated on both sides and folded longitudinally, the figure being an enlarged transverse sectional view through the folded strips as positioned together for winding.

Fig. 8 is a view similar to Fig. 7, showing a further modification utilizing longitudinally folded strips of foil; in this instance, however, the individual foils being coated on one side only.

Fig. 9 illustrates an additional modification utilizing strips of foil coated on one side and having the dielectric coating extending marginally beyond one edge of the foil, the figure being a transverse section similar to Figs. 7 and 8.

Fig. 10 is an elevational view, mostly diagrammatic, of a more elaborate coating and drying apparatus providing for cyclic operation and recovery of the solvent vehicle of the plastic dielectric.

Very broadly speaking, the novel capacitor hereof is formed by coating metal foil, preferably tin foil, with a plastic dielectric material in solution, drying or hardening the coatings into tough flexible films and winding two strips or ribbons of the coated foil together in the ordinary manner of winding foil wound condensers. A lead is then soldered to an edge of one strip at one end of the capacitor and another to an edge of the other strip at the other end of the unit, forming a completely usable capacitor. If a flat unit is desired the capacitor may be wound on a flat mandrel, or the cylindrical unit may be flattened by application of suitable pressure. Moreover, it will generally be found desirable to enclose the capacitor within a moisture proof casing and in which, if desired, it may be potted with wax or other material in a manner known in the art.

The dielectric coating material for use in the present invention may be chosen from the field of known plastics or resinous materials having the required electrical properties. Among the thermoplastic resins suitable for use in the present invention may be cited such materials as cellulose acetate, cellulose nitrate, ethyl cellulose, methyl methacrylate, polystyrene, polyvinyl chloride, polyvinyl acetate, and copolymers of vinyl chloride and vinyl acetate, and other similar resins. These resins all have different more or less desirable electrical properties and a selection may be made determined by the requirements of the particular capacitor being produced. Of course, other plastics or resins having desired electrical properties may be employed and no doubt other similar substances will be developed as the plastics art progresses and may be employed in the present invention provided they exhibit the desired electrical properties and are capable of being deposited as a thin film upon the foil electrodes.

At the present time, however, the invention prefers to employ as the dielectric coating the plastic polystyrene, this because of its remarkable electrical properties, its ease of handling and application to the foil in thin films, its satisfactory mechanical properties, and its availability as a polymer of high uniform quality. Polystyrene has a power factor comparable to mica of about .01% at one megacycle and only about .04% at wave lengths of 100 cm., compared to about 5.0% for paper. It is also useful at wave lengths as low as 1 cm. It has a high volume resistivity of from $10^{15}$ to $10^{19}$ ohm/cc. It has a high dielectric strength of from 3000 to 5000 volts per mil, is nonhygroscopic to an extreme degree and has a dielectric constant of about 2.5. As previously explained this material is now readily obtainable in the commercial market and, in view of the above set forth highly desirable electrical properties, is admirably suited for employment as the dielectric film or coating in the practice of the present invention.

As an example of a manner in which a film of dielectric may be formed on the faces of metal foil, in the practice of the present invention, preparatory to winding the foil into a completed condenser, reference may be had to Figs. 5 and 6 of the drawings which illustrate a relatively simple apparatus for application and drying or hardening of the coatings.

Thus, in these two figures, there will be seen a bracket 10 supporting a spindle 11 which accommodates a reel 12 carrying a supply of metal foil 13 in strip or ribbon form. A spring check 14 (Fig. 6) may be employed on the spindle 11 in order to exert a suitable drag or tension upon the rotation of the reel 12. As previously indicated it is preferable that the ribbon 13 be formed of the well known tin foil although copper, bronze and aluminum foils have been employed in the practice of the invention with equally satisfactory results.

The foil 13 passes from the reel 12 downwardly into a tank or receptacle 15 containing the plastic dielectric material in solution, acquiring a thin coating of the solution on both faces as it passes through the liquid. Trained under an idler roll 16 located within the coating tank, the strip emerges from the tank in an upward direction, as readily seen, and travels upwardly through a heating zone indicated generally by the three electric heating units 17. The latter may be augmented by or even replaced by one or more devices 18 providing a high frequency induction field, all for the purpose of drying the tacky film into a hardened flexible coating. Leaving the drying stage the coated foil now passes over an idler roll 19, supported on a suitable standard 20 and is wound upon a reel 21 detachably mounted on a shaft 22 (see Fig. 6) driven by a motor 23 through suitable reduction gearing indicated at 24. Preferably either the motor has variable speeds or the gearing is variable in order to control the rate of travel of the foil ribbon 13 to vary the thickness of the coating as desired, since the coating thickness is a function of the rate of travel of the foil through the coating bath.

The reels 21, when filled, may be accumulated or stored for future use of the contents or the condensers may be immediately produced by winding together coated strips from two reels 21. Moreover, if desired, the coating and winding operations may be continuous, strips of coated foil being led from the coating and drying stages direct to winding machines.

As previously mentioned, polystyrene is the plastic preferred as the dielectric in the practice of the invention. A solution of the polymer put down in a suitable solvent is maintained within the tank 15, care being exercised to maintain the tank sufficiently filled with the solution to provide a desired period of contact with the foil 13.

The polystyrene polymer is obtained from commercial sources in powdered form or in the form of relatively small crystals. The solution may be formed through the use of various solvents for the polymer among which may be mentioned carbon tetrachloride, benzine, toluene, amy acetate, and trichloroethylene. The latter of these typical solvents forms an admirable vehicle for the purposes of the present invention due to its non-inflammability, its high solvent power for polystyrene, its ready availability, and relatively moderate cost. Other suitable solvents will, of course, be ascertainable by those skilled in the art, since the sole function of the solvent is to make a workable viscous liquid out of the bulk polystyrene and act as a carrier during the coating process. Its evaporation under controlled conditions leaves a dry transparent coating of pure polystyrene on the foil.

All things considered, it has been found that the thickness of the coating depends principally on two major factors, namely, the viscosity of the solution and the rate of travel of the foil therethrough. Thus, the more viscous the solution, the thicker the coating, generally speaking. By the present process coatings anywhere from .5 to 2.0 mil can be successfully deposited upon the foil working at economical speeds. Probably the most important factor in the coating operation, however, is the viscosity of the solution. It has been found, for instance, that a ten percent change in the polystyrene content produces about a thirty-six percent variation in the thickness of the resultant film. Since in condenser design the thickness of the dielectric should be kept within two percent to five percent in order to keep control of the capacity, the viscosity of the solution should be controlled within about one percent. These factors, of course, are matters of factory or laboratory control and will be readily understood and practiced by those skilled in the art.

Proceeding according to the above prescribed directions it is possible, as previously mentioned, to form a solidified transparent impervious film of pure polystyrene on either face of the foil ribbon, the film being of any desired thickness within the range required for capacitors, the film thickness, of course, determining the properties of the condenser ultimately constructed from the coated foil.

The ultimate fabrication of capacitors from the polystyrene coated foil is a simple matter and may proceed according to the general manner of winding the interleaved type of condenser. Thus, two ribbons of the coated foil are led together to the mandrel of a condenser winding machine, and wound together into tubular form. The size and capacity of the condenser being produced will determine the length of coated foil necessary for each unit and will follow rather closely the requirements of the ordinary interleaved condensers. Upon removal from the winding machine a lead is soldered to each electrode at either end of the condenser, as is customary, and the unit may then be utilized in tubular fashion either with or without a protective casing. However, since it will generally be found desirable to shape the condenser into the form of the well known flat mica capacitors in order that it may be accommodated in equipment where mica capacitors are frequently employed, the tubular wound capacitor may be flattened by the use of mild pressure at a temperature of about 120° F., thus creating a condenser of the conventional size and shape of mica capacitors. The heat employed also serves to further cure the unit and weld the structure into a more or less solid mass. The unit, if desired, can then be encased or potted into a premolded case such as conventionally employed for mica capacitors, or a case may be molded around the capacitor.

The resultant capacitor is a light weight compact unit partaking of many of the advantages of mica condensers and, in some cases, even surpassing the qualities of the latter, as pointed out hereinbefore. In addition to providing a satisfactory substitute for mica condensers, the present capacitor has advantages over other foil-mica-substitute capacitors which are legion. First, one step is eliminated by application of the dielectric direct to the foil, since the production of separate dielectric strips is not required. Second, perfect adherence of conductor and dielectric forms a more efficient capacitor. Third, the foil itself acts as a carrier for the dielectric, doing away with the difficulty of handling the separate thin brittle strips. Fourth, the dielectric film can be made as thin or thick as desired for the voltage limits, with no increased difficulty in handling. Thus, a film of $\frac{1}{10}$ mil thickness could be used for low voltages, while handling a strip of such thinness as a separate unit in a winding machine would be highly impracticable, even if such a thin strip could be commercially produced as a separate unit. Fifth, the capacitor could be wound with the polystyrene coated foil while the coatings are still very slightly plastic due to incomplete evaporation of the solvent, thus avoiding the brittleness and breakage sometimes encountered in separate films. Sixth, final complete drying of the finished unit, particularly under slight pressure and heat, results in a solid polymerized unit which in effect is homogeneous since the films weld together and make it impossible to unwind the condenser after it has hardened. Seventh, the handling of only two pieces in the winding machines, instead of a minimum of four, is a much more economical operation. All of these factors, together with the demonstrated electrical superiority of the present capacitor, render the same a highly satisfactory mica substitute condenser and one which far surpasses any such that have previously been known.

While the hereinbefore described procedure will produce a satisfactory condenser according to the present invention, there are other aspects which tend to improve the characteristics and performance of the device, these factors residing both in the film forming operations and the condenser winding procedure. Thus, in some instances it has been found that the edges of the foil strip may not be completely and continuously covered or coated with the plastic dielectric. This may be due to surface tension or to other factors not yet recognized. It is, of course, undesirable that any uncoated edges of one foil come in contact with similarly uncoated edges of the other foil since this would naturally cause short circuiting in the condenser. Various procedures in the coating operation are available to assure the formation of a suitable coating on the strip edges. Among these may be mentioned the creation of an electrical potential between the metal foil and a suitable electrode within the coating bath. The addition of a suitable plasticizer to the coating bath is also an assistance in assuring an edge coating. Various other expediencies for assuring the edge coating may also be readily determinable by those skilled in the art.

However, the conventional manner of winding condensers assures that the edges of the respective strips of foil will be properly insulated from one another, since condensers are always wound in overlapped relation to facilitate the attachment of leads. This operation is illustrated in Figs. 1, 2 and 3 of the drawings. The coated strips are staggered for a distance of about 1/8 inch, as clearly seen in Fig. 2, where the respective coated strips 30 and 31 are shown as being wound together in slightly staggered relation. In this fashion the edge 30ᵃ of the strip 30 is buried within the tube and removed from the adjacent edge of the strip 31, while the edge 31ᵃ of the strip 31 is likewise removed from any possibility of contact with the adjacent edge of the strip 30. This arrangement completely eliminates any danger of short circuit or leakage between adjacent edges of the two electrodes. Moreover, it is a simple matter to solder a lead to the edge 30ᵇ of the strip 30 and another to the edge 31ᵇ of the strip 31.

The respective terminal ends of the two coated strips will present raw edges where the strips are severed into lengths. It is therefore desirable, when starting the winding operation, to fold the beginning or inner ends of each strip upon themselves twice in order to eliminate any contact between these ends. At the finish of the winding it is also necessary to perform the same operation upon the outer end of at least one of the strips. This manner of insulating the ends is clearly shown in Fig. 4 where 32 represents a coated foil strip, the raw end 33 of which is seen to be completely buried and insulated by the double fold.

This folding of the ends of the strips, however, while a simple matter in itself, may sometimes be found to be tedious and time-consuming in commercial production. To eliminate the necessity for thus folding the ends of the strips there may be employed a folded strip or clip of polystyrene film of about 1 mil thickness. At the start of the winding operation such a clip, illustrated at 34 in Fig. 3, is slipped over the end of one strip of coated foil, the numeral 35 indicating the latter. This eliminates any danger of contact between the two raw ends. At the completion of the winding operation a similar clip 36 is applied over the end of one of the coated foils, preferably the inner strip 30, as illustrated in Figs. 1 and 2. In the subsequent pressure flattening of the unit these plastic clips become more or less integrally united to the strip coatings and do not render the unit bulky to any appreciable extent. The polystyrene film for producing these insulating clips may be obtained, of course, from any suitable source. However, I have devised a simple and expeditious manner of forming separate strips of plastic film, which may be employed for this and other purposes, and will presently explain the same in some detail.

There have been explained above certain manners of insulating the raw ends of the coated foil strips. It has also been explained how the conventional staggering and overlapping of the two strips in winding the condenser assures that any uncoated longitudinal edges will not come in contact to cause short circuiting. If there are any substantial raw areas on the longitudinal edges of the strips, even though these edges are removed from one another, such raw edges may in some instances cause a reduction of the voltage breakdown of the condenser from the theoretical, due to the fact that the raw edge areas will reduce the thickness of dielectric material between the electrodes at any such raw areas. Therefore, I have devised certain manners of assuring the existence throughout the entire condenser of adequate thicknesses of the dielectric film between the respective electrodes. These aspects of the invention are illustrated in Figs. 7, 8 and 9.

In what is perhaps the simplest modification, seen in Fig. 7, there are utilized two strips of coated foil generally indicated at 40 and 41, the respective foil strips being coated with the plastic dielectric on both sides. As readily seen in the figure, each of the coated strips 40 and 41 is folded longitudinally upon itself on a central line and the strips are then placed together in the previously described overlapped or staggered relation for winding into condenser form. In this relation it will readily be seen that the outer dielectric coatings 40ᵃ and 41ᵃ of the respective strips always afford a thickness of dielectric equal to two layers of the film throughout the entire body of the condenser and that this thickness is necessarily consistent.

Another manner of accomplishing this same result is illustrated in Fig. 8. In this modification there are employed two coated foil strips, generally indicated at 42 and 43, folded upon themselves on a central longitudinal line and rolled together in the conventional staggered relation. In this instance, however, as clearly seen in the figure, the respective foil strips are coated on but one surface, thus effecting a saving of dielectric material, since presence of the same and the space within the interior of the electrode, as is the case in Fig. 7, is not required. As previously described, however, here again the coatings 42ᵃ and 43ᵃ assure an adequate thickness of dielectric between the electrodes, as can be plainly seen in the drawing.

In order to produce the foil strips coated on only one side, as employed in Fig. 8, it is merely necessary to place two clean foil strips together in face to face matching relation and then run the double strip through the coating procedure in the manner previously described, which will manifestly deposit a coating of the plastic dielectric upon the outer face of the respective foil strips. The two coated ribbons are then easily stripped apart, thus obtaining two foil strips each coated on but one side.

Fig. 9 shows yet another manner of assuring an adequate and uniform thickness of the dielectric throughout the entire body of the condenser. In this modification there are employed two coated foil strips, generally indicated at 44 and 45, also placed together in the conventional staggered relation. In this instance each of the metal foils is coated on but one side but the respective coatings 46 and 47 extend marginally beyond one edge of the foil strip as indicated at 48 and 49. These coated foils with the marginal extensions of dielectric coating are placed together with the bare side of one in engagement with the coated side of the other and with the marginal extensions of the respective strips extending in opposite directions, as clearly seen in the figure. Thus this arrangement also assures a thickness of the dielectric material which is consistent throughout the body of the condenser. While it is true that the present embodiment employs only one layer of dielectric between the foils, the thickness of the dielectric can be controlled in the coating operation to assure a desired breakdown voltage figure.

In forming the coated strips with marginal extension of the dielectric for employment in the arrangement of Fig. 9 a procedure somewhat similar to that employed for the coated strips of Fig. 8 is followed. In the present instance, however, two strips of clean foil are placed together in face to face engagement but in staggered relation so that one edge of each strip extends outwardly beyond the other for a distance of, say, 1/8 to 1/4 inch. In this relation the double foil strip is passed through the coating procedure resulting in the application of an unbroken coating to each side of the composite strip. Now, however, when the two coated ribbons are stripped apart the dielectric film remains in one piece on the outer surface of each foil ribbon. In other words, the plastic which was deposited on the inner face of that part of each foil which projects slightly beyond the edge of the other foil, remains integral with the coating which covers the entire face of the said other strip. While there is a perfect adhesion of the extended edge of the film to the foil sufficient to enable the film and the coating to be handled, the extended marginal portion or edge of the film coheres to the body portion of the film with a force greater than it adheres to the foil and this enables the strips of metal foil to be separated with the film coatings intact. Thus, when stripped apart, there are obtained two strips of foil each coated on one face only and each having a marginal extension of the coating along and beyond one edge.

As previously indicated, the capacitors, after being wound in the manner illustrated in Figs. 1 and 2 and flattened as hereinbefore described, may be enclosed within a suitable casing such as one molded of polystyrene, Bakelite or other insulating material, whereupon they will have the size and shape of the regular mica capacitors and are interchangeable therewith. While various types of casing will be found adaptable, I have devised a particularly advantageous casing which is preferably molded of polystyrene in order to have as good electrical characteristics as the condenser proper. This casing is disclosed and claimed in my companion application mentioned above.

In connection with Figs. 1 and 2 there has been described a manner of insulating the raw ends of the coated foil strips by enclosing them within a clip of plastic film. As a source of supply for these clips I have devised a simple and novel manner of producing separate films of the polystyrene or other desired plastic dielectric material. To accomplish this end a strip of metal foil or ribbon is coated on one or both sides in any of the manners previously or hereinafter described. By only an ordinary exercise of care one can then strip the film from the foil base and the film will be separated therefrom in unbroken and unmarred condition. Short sections of this film may then be readily folded upon themselves to form the insulating clips 34 and 36 seen in Figs. 4 and 1 and 2 respectively. Obviously, however, the separate plastic film of polystyrene, or other plastic resin employed, is a desirable material of general application and may be employed in various other fields. For instance, the said separate film may be produced in long unbroken strips, in the manner just described, and employed as individual dielectric separators in condenser manufacture in the same manner in which impregnated paper and other dielectric separators have been employed. By utilizing larger surface areas of a suitable material for a deposition base larger strips, and even sheets, of the plastic film may be produced for various and sundry purposes.

There has been described hereinbefore a simple and efficacious procedure and apparatus for depositing the desired dielectric coatings upon metal foil according to the present invention. I have additionally devised an apparatus arrangement and method of operation which is adapted to a somewhat more elaborate scale of production, providing as it does for building up the coatings in several applications, close control of drying temperatures, recovery of solvent, and the like. Such a system is illustrated diagrammatically in Fig. 10 of the drawings.

In this arrangement the foil 50 from the storage reel 51 passes through a narrow opening 52 into the interior of a completely closed chamber or stack 53, passing over an idler roller 54 to descend vertically into a cleaning tank 55 adapted to contain a cleaning or pickling liquid. In this tank there may be maintained a suitable substance which will remove all dirt, grit, grease and the like from the foil surfaces. This cleaning substance may comprise a suitable detergent such as a solution of sulphuric acid and potassium dichromate, or even a supply of a solvent similar to that used as the vehicle for the polystyrene. This precleaning of the foil assures a complete and uniform adherence of the coating material to the foil. Suitable brushes 56 may also be positioned in the cleaning tank for assisting the cleansing action.

Passing around the roller 57 the foil strip travels substantially vertically upward within the stack 53 where it is subjected to the relatively close and intense heat of the heating elements 58 which completely dry any of the cleansing agents. These heating elements may be ordinary radiant electric heaters but are preferably in the form of infra red lamps, providing a readily penetrant type of heat for a uniform drying of the polystyrene coatings which will appear on subsequent flights of the foil after passing through the coating bath.

Trained around the first roller 59 the cleaned foil strip now travels downwardly to enter the bath of polystyrene solution 60 which is maintained within the coating tank 61. Within the coating bath the foil passes under roller 62 which is in spring pressed engagement with roller 63, the pressure action on the strip between these two rolls serving to eliminate any entrapped air. On its second upward flight, immediately after leaving the coating bath, the strip passes between doctor rollers 64 which clean off any excess solution, thus providing the foil on its first excursion after subjection to the coating solution with a thin film of uniform material.

At the top of its flight the coated strip passes over another idler roller 59 and again descends into the coating bath and outwardly therefrom in the identical manner just described. Obviously any number of excursions into and out of the coating bath may be provided in order to build up a coating of the desired thickness. The tank 61 may, of course, be continuously or intermittently supplied with solution which may flow in and out and a close check, therefore, maintained upon the concentration thereof. After its last excursion into the coating bath and passage over the final idler roll 59 the coated strip is trained around idler roll 65 and passes out of the stack through a slit opening 66 where it is wound up upon the receiving roll 67.

The heating units 58, as previously explained, are arranged to direct rather intensive heat upon the clean foil and to supply a uniform drying heat for the coated film during its several passages over the idler rolls 59. While practically any temperatures below the melting point of polystyrene, or the particular plastic being employed, may be maintained within the chamber 53 it has been found that temperatures between about 120° F. and 135° F. produce an efficient drying and result in uniform coatings without blush. The temperature may of course be automatically controlled by a suitable temperature control device 68. Moreover, in order not to detract from the effect of the heated air, the rollers 59 may be suitably heated and the heating of these rolls, together with the pressure of the film thereagainst exerts somewhat of an embossing effect upon the plastic coatings causing them to be embossed out over the edges of the foil. The viscosity of the coating solution, the speed of travel of the film therethrough, and through the chamber, temperature and rate of drying, and other factors, can of course be suitably adjusted by standard factory control methods to produce the type and thickness of coating desired.

At its bottom the chamber 53 may be provided with a suitable air inlet duct 69 equipped with a fan or blower 70, a suitable device 71 for drying the air, and an air filter 72, all for assuring an adequate supply of clean dry air. The air supply may of course be precleaned and preheated as desired. Moreover, it may be desirable to maintain a pressure slightly above atmospheric within the chamber 53 in order to preclude the entrance of foreign particles or moist air at the foil inlets and outlets.

The stack 53 is also provided with a suitable outlet duct 73 through which the evaporated solvent laden air may be conducted to a point where the solvent can be recovered by conventional procedures.

Thus, the apparatus set up in Fig. 10 provides a complete plant for the continuous coating of the foil in closely controlled manner resulting in the production of a dielectric coated foil of high uniform quality and closely controlled electrical characteristics, which foil may be effectively employed in the construction of mica substitute condensers as hereinbefore specifically described.

It will be appreciated, however, that the herein specifically described manners of coating the foil, i. e., by passage through a liquid bath, are the modes of operation at present preferred. Other coating procedures, such as spreading the viscous plastic by an extrusion process over the foil as it travels, spraying the plastic solution onto the foil, and the like, will readily suggest themselves to those skilled in the art.

While I have hereinbefore shown and described my invention according to the best forms thereof now known to me, it is to be understood that the invention is not necessarily limited to the specific embodiments disclosed but includes all such variants thereof as may fairly come within the scope of the appended claims.

What is claimed is:

1. The method of producing foil-wound electric capacitors including the steps of assembling two strips of metal foil together in transversely staggered face-to-face relation, passing the assembly through a solution of plastic dielectric material to deposit a coating thereof simultaneously upon the exposed surfaces of the assembly, subjecting the coated assembly to heat to evaporate the solvent and harden the coating, maintaining intact the film on each face of the assembly, but separating the strips to provide individual foil strips each coated on but one surface with a film coextensive with one edge of the strip and extended marginally beyond the opposite edge thereof; and winding two such strips together with the strips transversely staggered and insulated from each other by the films with the marginal extensions of the films positioned along the inner edges of the foil whereby the strips are insulated from each other by films extending throughout the width of zone where the strips are face-to-face and to each side of said zone.

2. The method of making foil wound electrical capacitors which comprises, coating a plurality of strips of metal foil simultaneously with plastic dielectric material on one surface of each strip, extending the coating marginally beyond one side edge of the strip, and assembling at least two of such strips together in superposed relationship with the coating of one of such strips interposed between the said two strips and the marginally extending portion of such coating adjoining the other strip.

3. The method of producing a coated metal foil coated on one surface with plastic dielectric material which comprises assembling two strips of metal foil together face to face in transversely staggered relationship, passing the assembly through a solution of plastic dielectric material having a volatile solvent to deposit a coating thereof simultaneously upon the exposed surfaces of the assembly, subjecting the coated assembly to heat to evaporate the solvent and harden the coatings and separating the strips whereby each strip has a coating covering one surface and extending marginally beyond one edge.

4. A method of making coated foil having the coating extend as a film beyond one edge of the foil, which consists in assembling two strips of metal foil in transverse staggered relationship, simultaneously coating the strips by passing them through a bath of film-forming material containing a volatile solvent, drying out the solvent, and separating the two foil strips whereby each strip is completely coated on one face only and having an extended film edge along one edge of the foil of a width equal to the amount of staggering of the two foils.

5. A method of making coated foil having the coating extend as a film beyond one edge of the foil, which comprises assembling in face to face transverse staggered relationship a strip of metal foil and a member consisting of a strip metal insoluble in the solvents used, passing the assembled foil and member simultaneously through a bath of film-forming material containing a volatile solvent, drying out the solvent, and separating from the member the metal foil strip with one face only completely coated and having an extended film edge along one edge of the foil.

6. The method of making metal foil wound electrostatic capacitors which consists in assembling two strips of metal foil in transverse staggered relationship, simultaneously coating the strips by passing them through a bath of film-forming material containing a volatile solvent, drying out the solvent, separating the two foil strips whereby each strip is completely coated on one face only and having an extended film edge along one edge of the foil of a width equal to the amount of staggering of the two foils when assembled, and winding two such strips of coated foil together with the strips in staggered relationship, with the coating of one of the strips interposed between the strips and with the marginal film at the edges of the strips extending in opposite directions.

7. The method of producing a condenser foil coated on one surface with polystyrene, which comprises assembling two strips of metal foil together face to face in transversely staggered relationship, passing the assembly through a solution of polystyrene having a volatile solvent to deposit a coating thereof simultaneously upon the exposed surfaces of the assembly, subjecting the coated assembly to heat to evaporate the solvent and harden the coatings, and separating the strips whereby each strip has a coating covering one surface and extending marginally beyond one side edge.

8. The method of producing foil-wound electrostatic capacitors including the steps of assembling two strips of metal foil together in transversely staggered face-to-face relation, passing the assembly through a solution of polystyrene to deposit a coating thereof simultaneously upon the exposed surfaces of the assembly, subjecting the coated assembly to heat to evaporate the solvent and harden the coating, maintaining intact the film on each face of the assembly, but separating the strips to provide individual foil strips each coated on but one surface with a film coextensive with one edge of the strip and extended marginally beyond the opposite edge thereof; and winding two such strips together with the strips transversely staggered and insulated from each other by the films with the marginal extensions of the films positioned along the inner edges of the foil whereby the strips are insulated from each other by films extending throughout the width of zone where the strips are face-to-face and to each side of said zone.

9. The method of making foil-wound electrastatic capacitors which comprises assembling a strip of metal foil in face-to-face overlapping relationship with a member consisting of a ribbon of metal insoluble in the solvents used and extended laterally beyond the foil along one side edge thereof, applying a coating of polystyrene to the exposed face of the foil and to the exposed surfaces of the said member simultaneously, drying said coating, stripping from said member the foil together with the film lying thereon and on said overlapping portion, and winding two such strips together with the strips in staggered relationship, with the films between the strips throughout the convolutions extending laterally in both directions beyond the zone in which the strips are disposed face-to-face.

10. The method of coating metal foil and arranging the metal foil continuous with the coating which includes the steps of applying the foil in face-to-face transversely staggered relationship to a member consisting of a strip of metal insoluble in the solvents used which overlaps and extends beyond one edge of the foil, coating the assembly simultaneously with a solution of polystyrene, subjecting the assembly to heat to evaporate the solvent and harden the polystyrene into a film, and stripping from the said member the foil with the coating thereon and the film projecting therefrom as an extension of the coating.

11. The method of making foil wound electrostatic capacitors which comprises, coating a plurality of strips of metal foil simultaneously with polystyrene on one surface of each strip, extending the coating marginally beyond one side edge of the strip, and assembling at least two of such strips together in superposed relationship with the coating of one of such strips interposed between the said two strips and the marginally extending portion of each such coating adjoining the unextended edge of the other strip.

12. A method of making coated metal foil which consists in assembling two strips of metal foil in transverse staggered relationship, simultaneously coating the strips by passing them through a bath of polystyrene containing a volatile solvent, drying out the solvent, separating the two foil strips whereby each strip is completely coated on one face only and having an extended film edge along one edge of the foil of a width equal to the amount of staggering of the two foils.

13. A method of making coated metal foil which comprises assembling in face to face transverse staggered relationship a strip of metal foil and a member consisting of a ribbon of metal insoluble in the solvents used, passing the assembled foil and member simultaneously through a bath of polystyrene containing a volatile solvent, drying out the solvent, and separating from the member the metal foil strip with one face only completely coated and having an extended film edge along one edge of the foil of a width equal to the staggering of the metal foil and said member when initially assembled.

14. The method of making metal foil wound electrostatic capacitors which consists in assembling two strips of metal foil in transverse staggered relationship, simultaneously coating the strips by passing them through a bath of polystyrene containing a volatile solvent, drying out the solvent, separating the two foil strips whereby each strip is completely coated on one face only and having an extended film edge along one edge of the foil of a width equal to the amount of staggering of the two foils when assembled, and winding two such strips of coated foil together with the strips in staggered relationship, with the coating of one of the strips interposed between the strips and with the marginal films at the edges of the strips extending in opposite directions.

15. The method of making foil-wound electric capacitors which comprises assembling a strip of metal foil in face-to-face overlapping relationship with a member consisting of a strip of metal insoluble in the solvents used and extended laterally beyond the foil along one side edge thereof, applying a coating of plastic dielectric material to the exposed face of the foil and to the exposed surfaces of said member simultaneously, drying said coating, stripping from said member the foil together with the film lying thereon and on said overlapping portion, and winding two such strips of foil together with the strips in transversely staggered relationship, with the films between the strips throughout the convolutions extending laterally in both directions beyond the zone in which the strips are disposed face-to-face.

16. A method of coating metal foil and having the coating extend as a film beyond one edge of the foil which includes the step of applying the foil in face-to-face transversely staggered overlapping relationship to a member which consists of a strip of material insoluble in the solvents used and which overlaps beyond one edge of the foil, coating the assembly simultaneously with a solution of a plastic resin, subjecting the assembly to heat to evaporate the solvent and harden the plastic into a film, and stripping from said member the foil together with the coating thereon and the film projecting therefrom as an extension of the coating.

17. The method of making foil wound electrical capacitors which comprises, forming strips of metal foil having a coating of plastic dielectric material on one surface of each foil, said coating being coextensive with one edge of said foil and extending marginally beyond the opposite edge of said foil, assembling at least two of such coated strips in transverse staggered relationship with that edge of each strip with which the dielectric coating is coextensive with the edge of the foil extending outwardly beyond the adjacent marginal extension of the dielectric material of the other strip.

18. The method of making foil wound electrostatic capacitors which comprises forming strips of metal foil having a coating of polystyrene on one surface of each foil, said coating being coextensive with one edge of said foil and extending marginally beyond the opposite edge of said foil, assembling at least two of such coated strips in transverse staggered relationship with that edge of each strip with which the polystyrene coating is coextensive with the edge of the foil extending outwardly beyond the adjacent marginal extension of the polystyrene coating of the other strip.

FREDERICK J. MARCO.

REFERENCES CITED

The following references are of record in the file of this patent:

UNITED STATES PATENTS

| Number | Name | Date |
| --- | --- | --- |
| 575,653 | Lee et al. | Jan. 19, 1897 |
| 775,694 | Wisner | Nov. 22, 1904 |
| 836,863 | Clausen | Nov. 27, 1906 |
| 1,682,031 | Bliziotis | Aug. 28, 1928 |
| 1,842,648 | Bartel | Jan. 26, 1932 |
| 1,842,970 | Hovey | Jan. 26, 1932 |
| 1,909,079 | Steerup | May 16, 1933 |
| 2,095,837 | Sandler | Oct. 12, 1937 |
| 2,101,182 | Kittredge | Dec. 7, 1937 |
| 2,227,720 | Kallander et al. | Jan. 7, 1941 |
| 2,231,407 | Castor | Feb. 11, 1941 |
| 2,259,496 | Soday | Oct. 21, 1941 |
| 2,268,673 | Reynolds | Jan. 6, 1942 |
| 2,288,585 | Partee | June 30, 1942 |
| 2,303,368 | Keuffel et al. | Dec. 1, 1942 |
| 2,311,616 | Gordon et al. | Feb. 16, 1943 |
| 2,321,938 | Quinn | June 15, 1943 |
| 2,321,939 | Quinn | June 15, 1943 |
| 2,351,208 | Hermann et al. | June 13, 1944 |
| 2,366,853 | Greene | Jan. 9, 1945 |
| 2,375,960 | Stoops | May 15, 1945 |
| 2,387,759 | Jarvis | Oct. 30, 1945 |